(12) United States Patent
Sumiya

(10) Patent No.: US 11,798,592 B1
(45) Date of Patent: Oct. 24, 2023

(54) TAPE REEL IN WHICH A BENDING ELASTIC MODULUS OF A FIRST FLANGE IS SMALLER THAN THAT OF A SECOND FLANGE, AND TAPE CARTRIDGE

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/183,171

(22) Filed: Mar. 14, 2023

(30) Foreign Application Priority Data

Apr. 5, 2022 (JP) .................................. 2022-063038

(51) Int. Cl.
| | | |
|---|---|---|
| *G11B 23/027* | (2006.01) | |
| *G11B 23/037* | (2006.01) | |
| *G11B 23/107* | (2006.01) | |
| *G11B 23/04* | (2006.01) | |
| G11B 23/087 | (2006.01) | |

(52) U.S. Cl.
CPC .......... *G11B 23/044* (2013.01); *G11B 23/027* (2013.01); *G11B 23/037* (2013.01); *G11B 23/107* (2013.01); *G11B 23/08728* (2013.01)

(58) Field of Classification Search
None
See application file for complete search history.

(56) References Cited

U.S. PATENT DOCUMENTS

| | | | |
|---|---|---|---|
| 2011/0192929 A1* | 8/2011 | Hiraguchi | G11B 23/044 |
| | | | 242/608 |
| 2012/0305693 A1 | 12/2012 | Takenoshita et al. | |

FOREIGN PATENT DOCUMENTS

| | | |
|---|---|---|
| JP | 2002-251859 A | 9/2002 |
| JP | 2010-044845 A | 2/2010 |
| JP | 2012-248253 A | 12/2012 |

* cited by examiner

*Primary Examiner* — Craig A. Renner
(74) *Attorney, Agent, or Firm* — SOLARIS Intellectual Property Group, PLLC

(57) ABSTRACT

A tape is prevented from moving in a width direction and the tape is prevented from being damaged in a state in which the tape is wound around a tape reel. There is provided a tape reel including: a cylindrical portion around which a tape is wound; a first flange annularly projecting toward an outer side in a radial direction of the cylindrical portion from the cylindrical portion; and a second flange separated from the first flange in an axial direction of the cylindrical portion and annularly projecting toward the outer side in the radial direction from the cylindrical portion, in which a distance between the first flange and the second flange becomes narrower while extending toward the outer side in the radial direction, and a bending elastic modulus of the first flange is smaller than a bending elastic modulus of the second flange.

8 Claims, 16 Drawing Sheets

FIG. 5
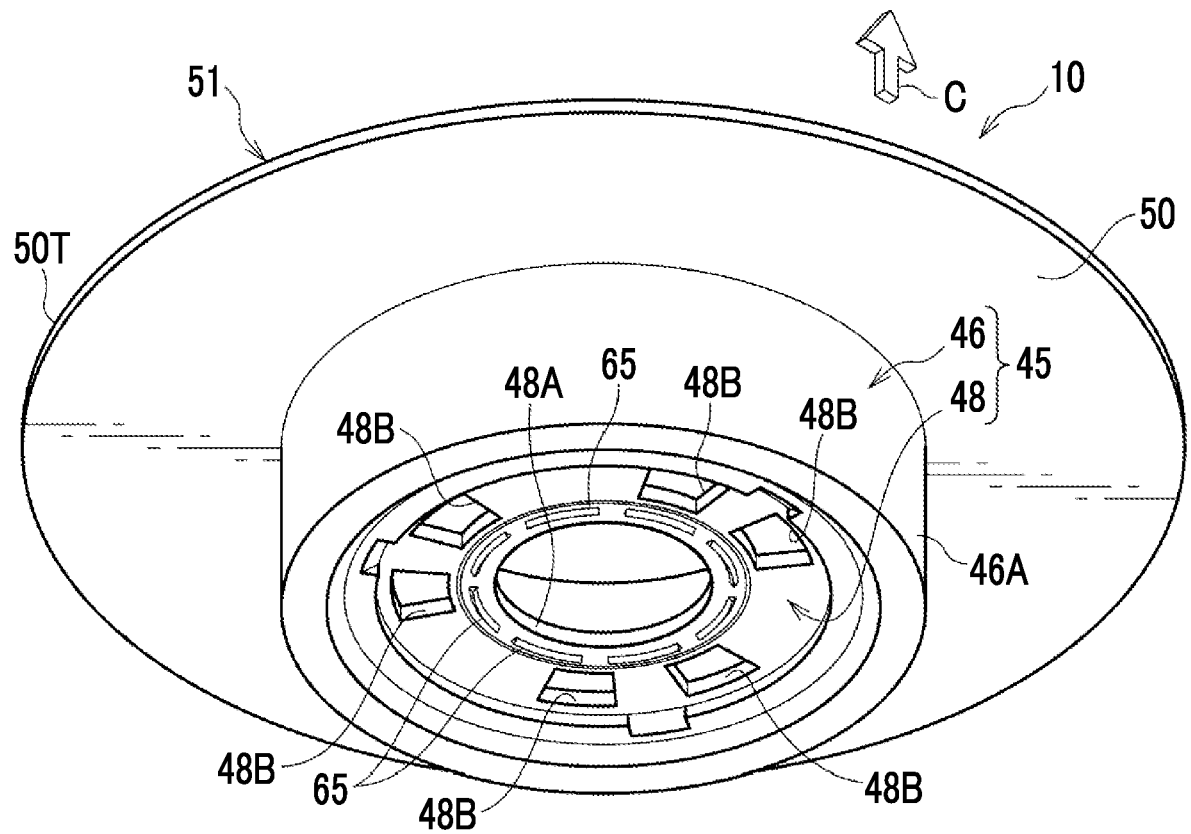
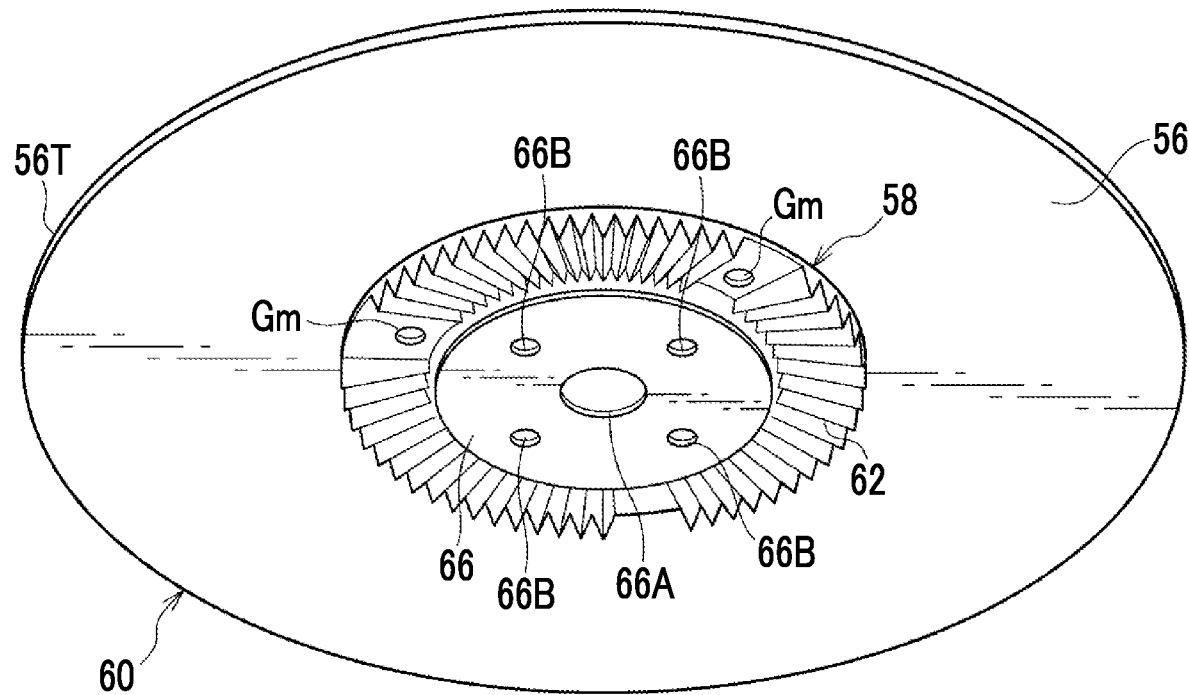

FIG. 6
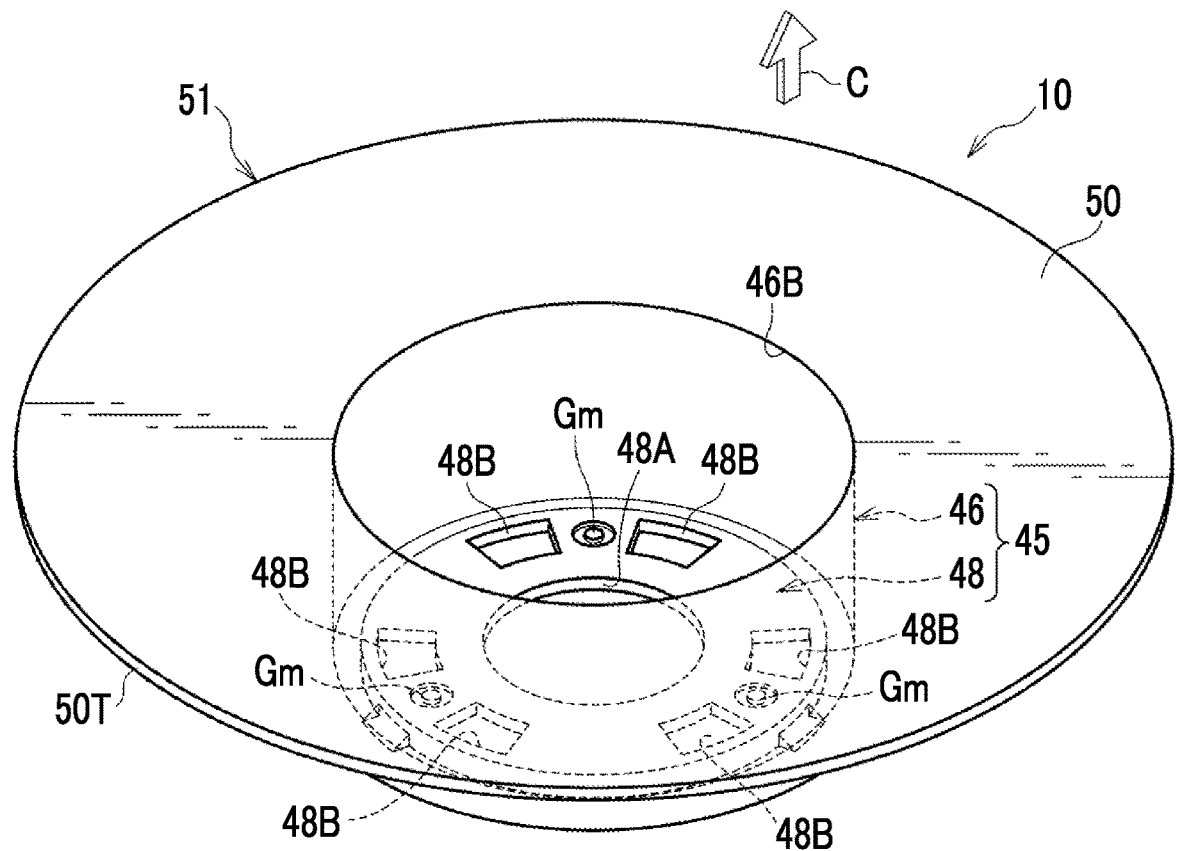
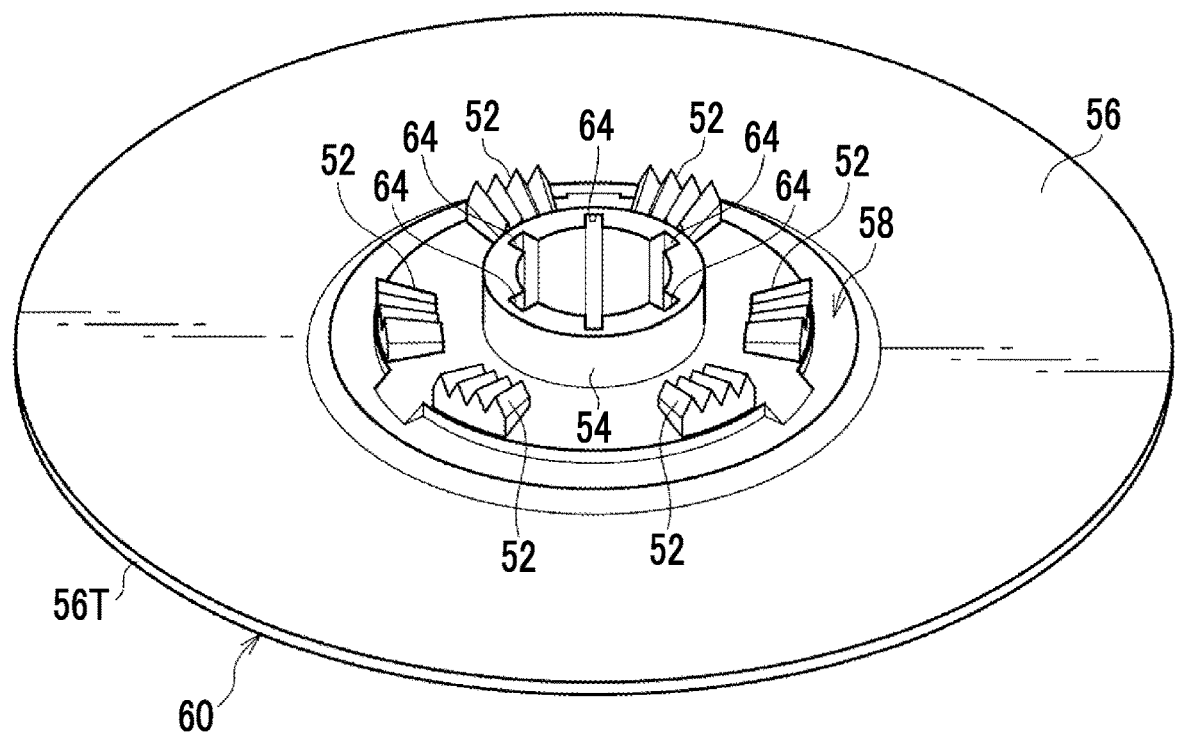

TAPE REEL IN WHICH A BENDING ELASTIC MODULUS OF A FIRST FLANGE IS SMALLER THAN THAT OF A SECOND FLANGE, AND TAPE CARTRIDGE

Cross-Reference to Related Application

This application claims priority under 35 USC 119 from Japanese Patent Application No. 2022-063038 filed Apr. 5, 2022, the disclosure of which is incorporated by reference herein in its entirety.

BACKGROUND OF THE INVENTION

Technical Field

The technology of the present disclosure relates to a tape reel and a tape cartridge.

Related Art

JP2010-44845A discloses a tape reel comprising a hub including a bottom portion and a cylindrical portion protruding from the bottom portion.

JP2012-248253A discloses a recording tape cartridge comprising a reel hub, a magnetic tape wound around the reel hub, and a lower flange and an upper flange provided at both ends of the reel hub in an axial direction so as to face each other.

In a state in which the entire amount of the magnetic tape of the reel hub is wound, the magnetic tape is biased to the upper flange, and an edge clearance distance between a lower end of an outermost peripheral portion and the lower flange is set to 0.18 mm or more and 0.46 mm or less. An enlargement ratio of a facing distance between the lower flange and the upper flange increases while extending toward an outer peripheral side.

JP2002-251859A discloses a tape reel including an upper flange and a lower flange provided at upper and lower ends of a cylindrical hub around which a magnetic tape is wound, respectively. The more the magnetic tape is wound around the hub, the smaller a dimension between the upper and lower flanges on an outer peripheral side is gradually with respect to an outer peripheral surface of the hub.

SUMMARY OF THE INVENTION

One embodiment according to the technology of the present disclosure provides a tape reel capable of preventing a tape from moving in a width direction and preventing the tape from being damaged in a state in which the tape is wound around the tape reel, and a tape cartridge.

A first aspect according to the technology of the present disclosure is a tape reel comprising: a cylindrical portion around which a tape is wound; a first flange annularly projecting toward an outer side in a radial direction of the cylindrical portion from the cylindrical portion; and a second flange separated from the first flange in an axial direction of the cylindrical portion and annularly projecting toward the outer side in the radial direction from the cylindrical portion, in which a distance between the first flange and the second flange narrows while extending toward the outer side in the radial direction, and a bending elastic modulus of the first flange is smaller than a bending elastic modulus of the second flange.

A second aspect according to the technology of the present disclosure is the tape reel according to the first aspect in which the distance between an edge part of the first flange, which is provided on the outer side in the radial direction, and an edge part of the second flange, which is provided on the outer side in the radial direction, is narrower than a width of the tape.

A third aspect according to the technology of the present disclosure is the tape reel according to the first or second aspect in which the bending elastic modulus of the first flange is smaller than a bending elastic modulus of the tape.

A fourth aspect according to the technology of the present disclosure is the tape reel according to any one of the first to third aspects in which the bending elastic modulus of the second flange is smaller than a bending elastic modulus of the tape.

A fifth aspect according to the technology of the present disclosure is the tape reel according to any one of the first to fourth aspects in which the second flange is formed integrally with the cylindrical portion.

A sixth aspect according to the technology of the present disclosure is the tape reel according to any one of the first to fifth aspects in which the first flange is a separate body from the cylindrical portion.

A seventh aspect according to the technology of the present disclosure is the tape reel according to the sixth aspect in which the first flange is inclined with respect to an orthogonal direction to the axial direction when viewed in the radial direction, and the second flange projects along the orthogonal direction when viewed in the radial direction.

An eighth aspect according to the technology of the present disclosure is a tape cartridge comprising: the tape reel according to any one of the first to seventh aspects; and a case that rotatably supports the tape reel and accommodates the tape reel and a tape wound on the tape reel.

BRIEF DESCRIPTION OF THE DRAWINGS

FIG. 5 is an exploded perspective view showing the tape reel according to the first embodiment as viewed from below.

FIG. 6 is an exploded perspective view showing the tape reel according to the first embodiment as viewed from above.

DETAILED DESCRIPTION

An example of an embodiment according to the technology of the present disclosure will be described with reference to the accompanying drawings.

Figure 1:
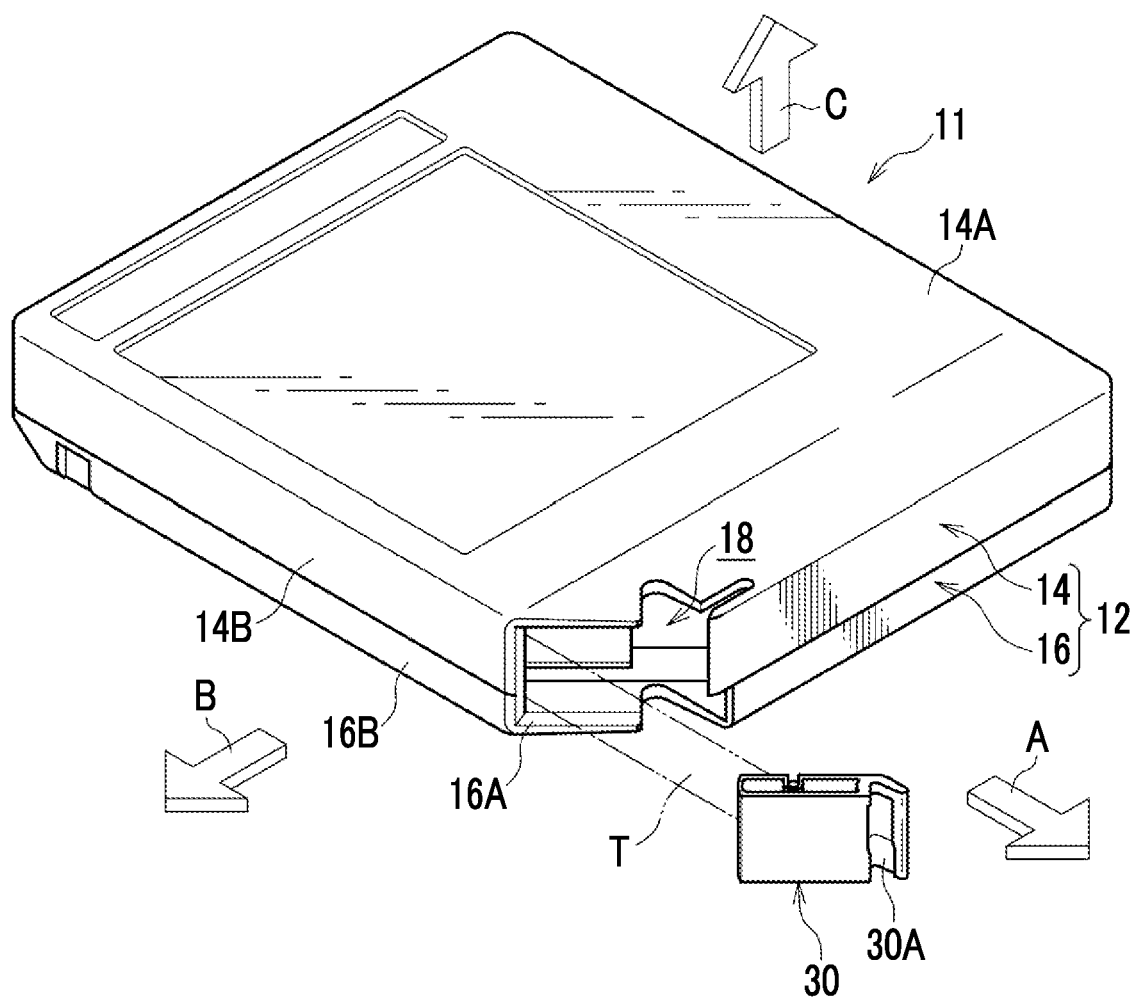
FIG. 1 is a perspective view showing a tape cartridge provided with a tape reel according to a first embodiment as viewed from above.

As shown in FIG. 1, a tape cartridge 11 includes a case 12. One tape reel 10 (see FIG. 3) is accommodated in the case 12. A recording tape T is wound around the tape reel 10. Details of the case 12 and the tape reel 10 will be described below. The case 12 is an example of a "case" according to the technology of the present disclosure. The tape reel 10 is an example of a "tape reel" according to the technology of the present disclosure. The tape cartridge 11 is an example of a "tape cartridge" according to the technology of the present disclosure.

The tape cartridge 11 is inserted into a drive device (not shown). In the drive device, the recording tape T is unwound from the tape cartridge 11, and information is written onto or read out from the recording tape T. As an example, the recording tape T has a structure in which a band-shaped base film made of a resin is coated with a magnetic material in a layered manner. The bending elastic modulus of the recording tape T is, for example, 6750 MPa or more and 9500 MPa or less.

In the drawings, an arrow A indicates a loading direction of the tape cartridge 11 into the drive device. A direction indicated by the arrow A is set as a front direction of the tape cartridge 11. A direction indicated by an arrow B orthogonal to the arrow A is set as a right direction of the tape cartridge 11, and a direction indicated by an arrow C orthogonal to the arrow A and the arrow B is set as an upper direction of the tape cartridge 11 and the tape reel 10. In addition, in the following, a radial direction and a circumferential direction of the tape reel 10 may be simply referred to as a "radial direction" and a "circumferential direction". The above-described front direction, right direction, and upper direction are directions defined for convenience and do not limit a direction of the tape cartridge according to the technology of the present disclosure.

As shown in FIGS. 1 to 4, the case 12 is formed in a rectangular flat box shape. The case 12 includes an upper case 14 and a lower case 16. Specifically, the upper case 14 includes a top plate 14A having a rectangular shape in a plan view, and a frame-shaped peripheral wall 14B erected along an outer edge of the top plate 14A. The lower case 16 includes a bottom plate 16A having a rectangular shape in a plan view, and a peripheral wall 16B erected along an outer edge of the bottom plate 16A. The case 12 is formed in a box shape in which the upper case 14 and the lower case 16 are joined by, for example, ultrasonic welding and/or screwing in a state in which an opening end of the peripheral wall 14B and an opening end of the peripheral wall 16B abut on each other. The upper case 14 and the lower case 16 are made of a resin, such as polycarbonate (PC), as an example.

An opening 18 is formed in the case 12. The opening 18 is formed at a corner portion on the leading side in the loading direction of the case 12 into the drive device. Specifically, the opening 18 is formed by cutting each of the top plate 14A, the peripheral wall 14B, the bottom plate 16A, and the peripheral wall 16B. The opening 18 is inclined with respect to the loading direction of the case 12 into the drive device. The recording tape T wound around the tape reel 10 can be pulled out through the opening 18.

A circular gear opening 20 that penetrates the bottom plate 16A is provided in a central portion of the bottom plate 16A of the lower case 16. A reel gear 62, which will be described below, is exposed from the gear opening 20. The reel gear 62 exposed from the gear opening 20 is meshed with a drive gear 108 (see FIG. 3) formed on a rotary shaft 100 of the drive device (see FIG. 4). Then, the reel gear 62 is rotationally driven by the drive gear 108, whereby the tape reel 10 rotates relative to the case 12 in the case 12. An annular rib 22 is provided at an edge portion of the gear opening 20 in the bottom plate 16A so as to protrude inward of the case 12 (see FIG. 3). The annular rib 22 positions the tape reel 10 in the case 12, as will be described below.

Positioning holes 24 and 26 are formed on the front end side of an outer surface of the bottom plate 16A. The positioning holes 24 and 26 each have a shape that is recessed from the bottom plate 16A toward the inner side of the case 12. The positioning holes 24 and 26 are disposed to be spaced from each other in a direction orthogonal to the loading direction of the case 12 into the drive device. Among the positioning holes 24 and 26, a positioning hole relatively close to the opening 18 is the positioning hole 24, and a positioning hole relatively far from the opening 18 is the positioning hole 26.

The positioning hole 24 has a square shape in a bottom view and circumscribes a positioning pin of the drive device. The positioning hole 26 has an oblong shape in a bottom view, and a direction (a direction of the arrow B) orthogonal to the loading direction of the case 12 into the drive device is a longitudinal direction of the positioning hole 26.

The width of the positioning hole 26 is set to a width in which a positioning pin of the drive device is circumscribed. With this, the tape cartridge 11 is positioned in the drive device in a direction of the arrow A and the direction of the arrow B in a state in which the tape cartridge 11 is loaded into the drive device and the positioning pins are inserted into the positioning holes 24 and 26, respectively.

In the bottom plate 16A, portions around the positioning holes 24 and 26 are positioning surfaces 24A and 26A. The positioning surfaces 24A and 26A are relatively smoother than other portions of the bottom plate 16A. The positioning surfaces 24A and 26A come into contact with positioning surfaces of the drive device provided around the positioning pins of the drive device in a state in which the positioning pins are inserted into the positioning holes 24 and 26. With this, the tape cartridge 11 is also positioned in a vertical direction (in a direction of the arrow C) in the drive device.

Figure 2:
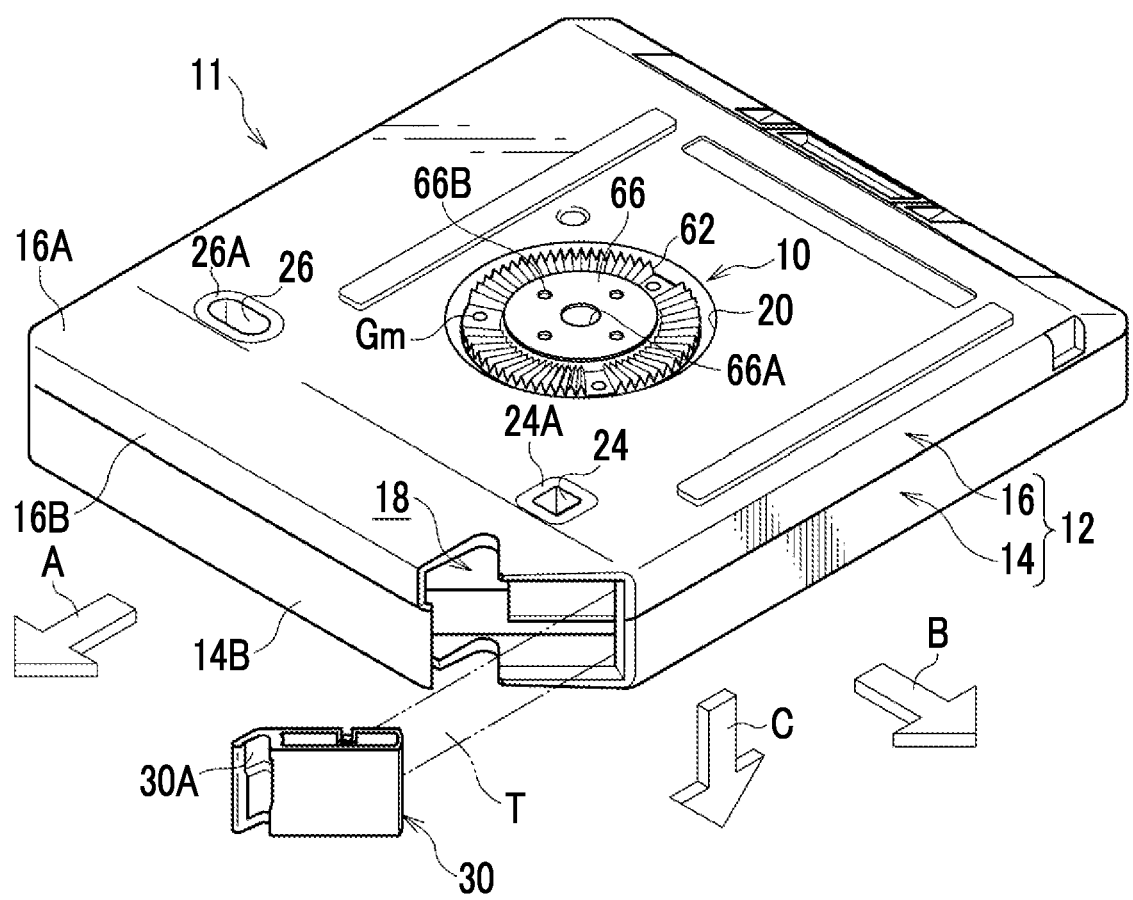
FIG. 2 is a perspective view showing the tape cartridge provided with the tape reel according to the first embodiment as viewed from below.
Figure 3:
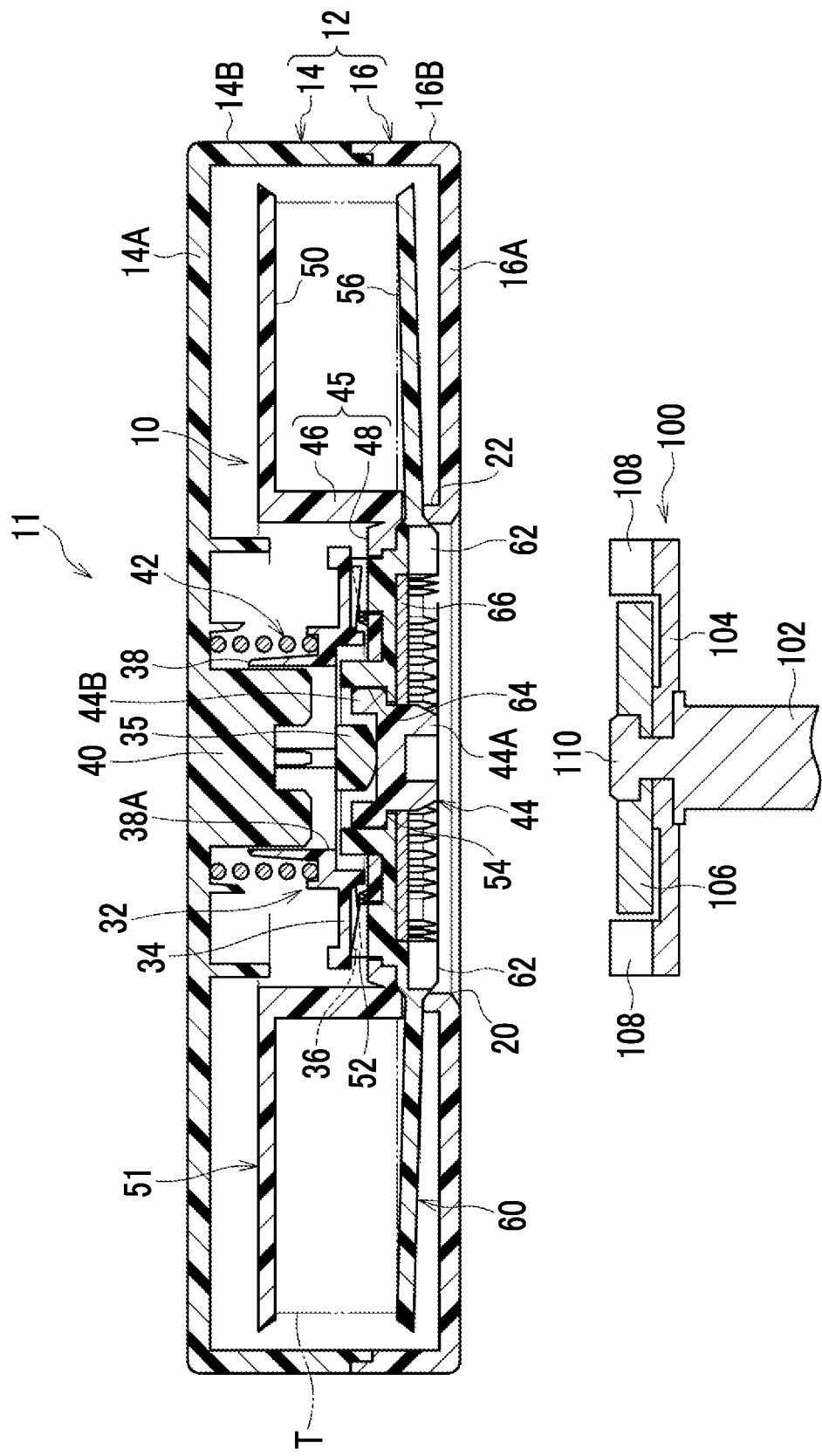
FIG. 3 is a cross-sectional view showing the tape cartridge provided with the tape reel according to the first embodiment in a rotation-locked state of a reel.
Figure 4:
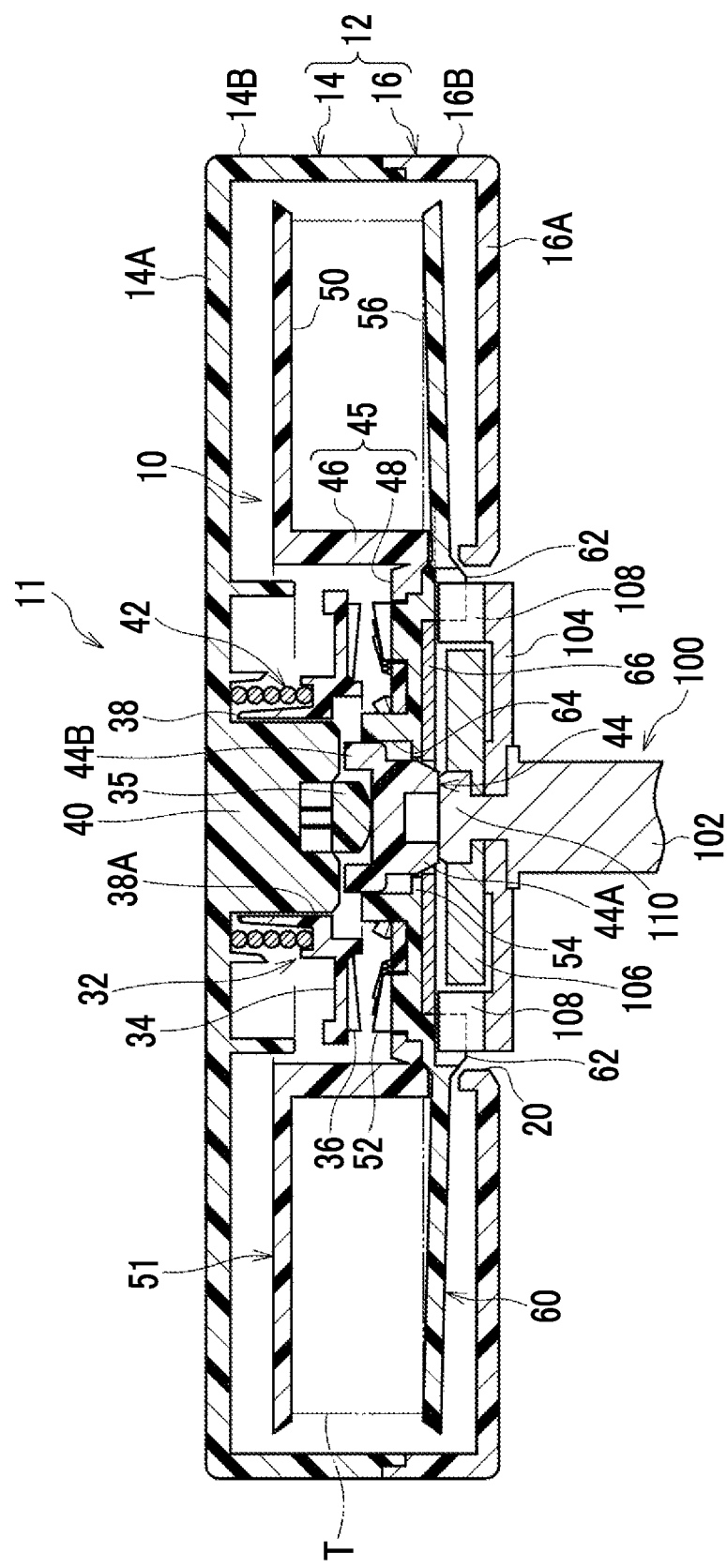
FIG. 4 is a cross-sectional view showing the tape cartridge provided with the tape reel according to the first embodiment in a rotation-unlocked state of the reel.
Figure 7:
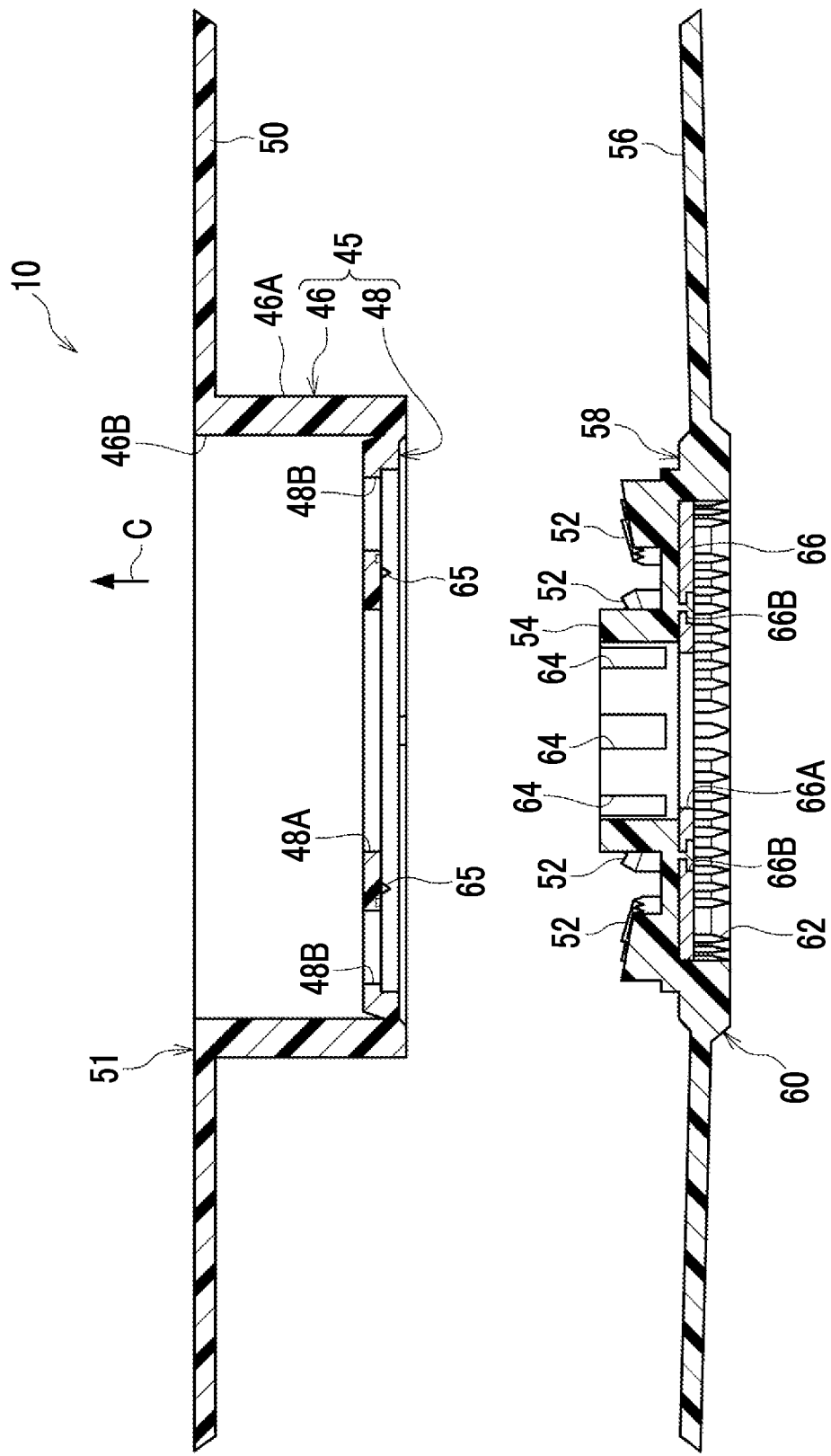
FIG. 7 is an exploded cross-sectional view showing the tape reel according to the first embodiment.

As shown in FIGS. 3 and 4, one tape reel 10 is rotatably accommodated in the case 12. The recording tape T is wound around the tape reel 10. As shown in FIGS. 1 and 2, a leader block 30 is attached to the tip of the recording tape T. The leader block 30 is accommodated on the inner side of the opening 18 of the case 12 when the tape cartridge 11 is not used. In this state, the leader block 30 closes the opening 18 to prevent dust and the like from entering the case 12.

An engaging recessed portion 30A is formed at the tip of the leader block 30. A pulling-out member that is engaged with the engaging recessed portion 30A is provided in the drive device. In the drive device, the recording tape T is pulled out from the case 12 by the pulling-out member that is in a state of being engaged with the engaging recessed portion 30A, and is guided to a winding reel of the drive device.

The tape cartridge 11 includes a brake member 32. The brake member 32 is a member that prevents the tape reel 10 from rotating in a state in which the tape cartridge 11 is not used.

The brake member 32 includes a disc-shaped disc portion 34. A braking gear 36 is formed downward on a peripheral edge portion of the disc portion 34. A cross protrusion 38 is formed upward from an axial center portion of the disc portion 34, and a sliding contact convex portion 35 is formed downward from the axial center portion of the disc portion 34.

An insertion groove 38A that has a cross shape in a plan view in conformity with the shape of the cross protrusion 38 is formed in the cross protrusion 38. A cross rib 40 formed on the top plate 14A is inserted into the insertion groove 38A so as to be relatively movable (slidable) in the up-down direction. In a state in which the cross rib 40 is inserted into the insertion groove 38A, the brake member 32 is non-rotatable with respect to the case 12 and is relatively displaceable in the up-down direction.

As shown in FIGS. 3 and 4, an engaging gear 52 is formed on the tape reel 10. As shown in FIG. 4, the engaging gear 52 protrudes to the upper side with respect to a bottom plate 48. The tape reel 10 is prevented from rotating with respect to the case 12 in a state in which the braking gear 36 of the brake member 32 is meshed with the engaging gear 52. By moving the brake member 32 in the up-down direction (that is, an axial direction of the tape reel 10) with respect to the case 12, the braking gear 36 is switched between meshing and meshing release with respect to the engaging gear 52. The braking gear 36 is in a rotation-locked position in a state of being meshed with the engaging gear 52, and is in a rotation-allowable position in a state of being released from the meshing.

The tape cartridge 11 is provided with a compression coil spring 42. The compression coil spring 42 biases the brake member 32 toward the bottom plate 48. The braking gear 36 of the brake member 32 is put into a state of being meshed with the engaging gear 52 by being biased by the compression coil spring 42.

The tape cartridge 11 includes a clutch member 44. The clutch member 44 is a member for releasing the tape reel 10 from the rotation-locked state with respect to the case 12 through the brake member 32.

The clutch member 44 includes a body part 44A formed in a columnar shape, and a plurality of guide pieces 44B projecting toward the outer side in the radial direction and the upper side from the upper outer periphery of the body part 44A.

The body part 44A of the clutch member 44 is inserted into a boss portion 54, which will be described below, provided in an axial center portion of the tape reel 10. Each guide piece 44B of the clutch member 44 is inserted into a guide slit 64, which will be described below. The body part 44A is inserted into the boss portion 54 and the guide piece 44B is inserted into the guide slit 64, whereby the clutch member 44 is unable to fall off downward and to rotate with respect to the tape reel 10, and is supported by the tape reel 10 in a state in which the relative displacement is allowed in the axial direction.

The sliding contact convex portion 35 is formed on an axial center portion of the brake member 32. The sliding contact convex portion 35 is pressed against an upper end surface of the body part 44A of the clutch member 44 by the biasing force of the compression coil spring 42.

In a state in which the sliding contact convex portion 35 is pressed against the upper end surface of the body part 44A, a lower end portion of the body part 44A of the clutch member 44 is exposed to the outer side (lower side) of the case 12 from the axial center portion of the tape reel 10. A lower end surface of the body part 44A is exposed to the outer side of the case 12, so that an operation from the outside is possible.

In the tape cartridge 11, the lower end surface of the body part 44A is pressed upward to move the clutch member 44 upward, whereby the brake member 32 moves upward together with the clutch member 44. Then, by moving the brake member 32 upward, the braking gear 36 and the engaging gear 52 are released from the meshing, and the rotation-allowable position is reached.

In the present embodiment, the rotary shaft 100 of the drive device is provided with the drive gear 108, and further includes a pressing portion 110 provided at a central portion of the rotary shaft 100. In the clutch member 44, the lower end surface of the body part 44A is pressed upward by the pressing portion 110 in response to the operation in which the drive gear 108 is meshed with the reel gear 62, which will be described below. Then, the clutch member 44 moves the brake member 32 from a braking position to a release position against the biasing force of the compression coil spring 42.

The rotary shaft 100 includes a rotary table 104. The rotary table 104 is fixed to an upper end of a rotation axis 102. The drive gear 108 is formed upward on a peripheral edge portion of the rotary table 104. The drive gear 108 can be meshed with the reel gear 62, which will be described below, of the tape reel 10. The drive gear 108 is meshed with the reel gear 62, whereby the rotary shaft 100 moves upward relative to the case 12, and the drive gear 108 is meshed with the reel gear 62. A disc-shaped magnet 106 is disposed on the inner side in the radial direction of the drive gear 108 in the rotary table 104. The rotary table 104 attracts a reel plate 66 of the tape reel 10 by the magnetic force of the magnet 106.

In the tape cartridge 11, the recording tape T is pulled out or wound up by the rotation of the tape reel 10. During the rotation of the tape reel 10, relative rotation occurs between the sliding contact convex portion 35 that does not rotate with respect to the case 12 and the clutch member 44 that rotates together with the tape reel 10. The tip (lower end) of the sliding contact convex portion 35 and an upper surface of the clutch member 44 are in sliding contact with each other by the relative rotation between the sliding contact convex portion 35 and the clutch member 44.

Reel Configuration

As shown in FIGS. 5 to 8, the tape reel 10 includes a hub 45. The hub 45 constitutes the axial center portion of the tape reel 10.

The hub 45 includes a cylindrical wall 46 and the bottom plate 48. The cylindrical wall 46 is an example of a "cylindrical portion" according to the technology of the present disclosure. An outer peripheral surface of the cylindrical wall 46 is a tape winding surface 46A around which the recording tape T is wound. The bottom plate 48 is a bottom portion that closes a lower portion of the cylindrical wall 46.

An upper end of the cylindrical wall 46 of the hub 45 is an opening end 46B. An upper flange 50 is formed at the opening end 46B. The upper flange 50 annularly projects toward the outer side in the radial direction of the cylindrical wall 46 from the opening end 46B. The upper flange 50 is formed coaxially and integrally with the cylindrical wall 46. The upper flange 50 is an example of a "second flange" according to the technology of the present disclosure.

In the present embodiment, the hub 45 and the upper flange 50 are made of a resin, and are integrally formed by injection molding as an example. An upper flange member 51 includes the hub 45 and the upper flange 50. As shown in FIG. 6, a plurality of (three in the illustrated example) gate traces Gm, which are traces of a gate for injecting a resin into a mold in a case in which the upper flange member 51 is injection-molded, are formed on the bottom plate 48.

In the present embodiment, in a state in which the recording tape T is not wound around the tape reel 10, the upper flange 50 projects in the orthogonal direction to the axial direction of the cylindrical wall 46 when viewed in the radial direction of the cylindrical wall 46. Therefore, in the cross-section shown in FIGS. 7 and 8, an angle θ2 formed by the cylindrical wall 46 and the upper flange 50 is a right angle. An edge surface of the cylindrical wall 46 on an opening end 46B side and the upper surface of the upper flange 50 are flush with each other, that is, in the same plane.

A circular center hole 48A is formed in an axial center portion of the bottom plate 48 of the hub 45. Further, a window portion 48B is formed in the bottom plate 48. As will be described below, the engaging gear 52 is provided on a center portion 58 of a lower flange member 60. The window portion 48B causes the engaging gear 52 to protrude to the upper side with respect to the upper surface of the bottom plate 48. A plurality of the window portions 48B (three pairs in total in the illustrated example) are provided along a circumference coaxial with the hub 45.

In the present embodiment, the upper flange member 51 is formed by injection molding of fiber reinforced plastic. The fiber reinforced plastic is a material in which 10% by mass of glass fibers as reinforcing fibers are mixed with polycarbonate as a thermoplastic resin.

In the present embodiment, the bending elastic modulus of the upper flange 50 is smaller than the bending elastic modulus of the recording tape T. As an example, the bending elastic modulus of the upper flange 50 is 3300 MPa or more and 6700 MPa or less.

Further, the tape reel 10 has a lower flange 56. The lower flange 56 is separated from the upper flange 50 in the axial direction of the cylindrical wall 46 and annularly projects toward the outer side in the radial direction of the cylindrical wall 46. The lower flange 56 and the upper flange 50 face each other in the axial direction of the cylindrical wall 46. The lower flange 56 is an example of a "first flange" according to the technology of the present disclosure.

In the present embodiment, the position of an edge part 56T (outer peripheral edge part) of the lower flange 56, which is provided on the outer side in the radial direction, and the position of an edge part 50T (outer peripheral edge part) of the upper flange 50, which is provided on the outer side in the radial direction, are aligned with each other when viewed in the axial direction of the cylindrical wall 46.

In the present embodiment, in a state in which the recording tape T is not wound around the tape reel 10, the lower flange 56 is inclined with respect to the orthogonal direction to the axial direction of the cylindrical wall 46 when viewed in the radial direction of the cylindrical wall 46. Specifically, the lower flange 56 approaches the upper flange 50 while extending toward the outer side in the radial direction from the inner side in the radial direction. Therefore, in the cross-section shown in FIG. 8, an angle θ1 formed by the cylindrical wall 46 and the lower flange 56 is an acute angle.

The distance between the lower flange 56 and the upper flange 50 gradually narrows while extending toward the outer side in the radial direction from the inner side in the radial direction in a state before the recording tape T is wound around the tape reel 10 (that is, in a state in which the recording tape T is not wound). Here, the distance between the edge parts of the upper flange 50 and the lower flange 56, which are provided on the outer side in the radial direction, is denoted by D1, and the distance between the edge parts on the inner side in the radial direction, is denoted by D2. Further, the width of the recording tape T is denoted by W1. In the present embodiment, the relationship of D1<W1<D2 is established. As an example, in a case in which the width W1 of the recording tape T is 12.65 mm, the distance D1 between the edge parts on the outer side in the radial direction is within a range of 12.55≤D1<12.65 mm, and the distance D2 between the edge parts on the inner side in the radial direction is within a range of 12.65<D2≤12.75 mm, so that the relationship of D1<W1<D2 is established.

The annular center portion 58 is joined to the bottom plate 48 of the hub 45. The lower flange 56 projects toward the outer side in the radial direction from the center portion 58. The lower flange 56 is fixed to the hub 45 via the center portion 58. The lower flange member 60 includes the lower flange 56 and the center portion 58. The lower flange member 60 is a separate body from the cylindrical wall 46. Therefore, the lower flange 56 is also a separate body from the cylindrical wall 46.

As shown in FIG. 5, the reel gear 62 is formed downward on the center portion 58 of the lower flange member 60. As shown in FIG. 4, the reel gear 62 can be meshed with the drive gear 108 of the rotary shaft 100 of the drive device. The reel gear 62 is formed such that a plurality of teeth are arranged so as to form an annular shape coaxial with the lower flange member 60 as a whole.

As shown in FIG. 6, the engaging gear 52 is formed upward from an upper surface side of the center portion 58. The engaging gear 52 can be meshed with the braking gear 36 of the brake member 32. That is, as described above, the engaging gear 52 is meshed with the braking gear 36 of the brake member 32 in a state in which the brake member 32 is in the braking position, and is released from the meshing with the braking gear 36 of the brake member 32 in a state in which the brake member 32 is in the release position.

In a state in which the engaging gear 52 is released from the meshing with the braking gear 36, the tape reel 10 is allowed to rotate about its own axis. In the present embodiment, a plurality of the engaging gears 52 (six in the example shown in FIG. 6) are provided along a circumference coaxial with the hub 45. Each of the engaging gears 52 can penetrate the corresponding window portion 48B of the hub 45 described above.

As shown in FIG. 6, the boss portion 54 is provided so as to protrude upward from the axial center portion of the center portion 58. The boss portion 54 has a cylindrical shape and can be fitted into the center hole 48A of the hub 45. A plurality of the guide slits 64 are provided on the upper portion of the boss portion 54 at intervals in a circumferential direction of the hub 45. Each guide slit 64 is open upward and inward in the radial direction. The guide piece 44B (see FIG. 4) of the clutch member 44 described above is inserted into each guide slit 64. The guide piece 44B is inserted into the guide slit 64, so that a guide function in the axial direction of the clutch member 44, a stopper function in the axial direction (fall-off prevention function), and a rotation stop function for the tape reel 10 are fulfilled.

Each portion including the lower flange 56, the center portion 58, the engaging gear 52, the boss portion 54, and the reel gear 62 of the lower flange member 60 is made of a resin, and is integrally formed by injection molding as an example. The lower flange member 60 is made of, for example, a resin material (as an example, the above-described polycarbonate containing glass fibers) which is the same as the material forming the hub 45 and the upper flange 50.

In the present embodiment, the bending elastic modulus of the lower flange 56 is smaller than the bending elastic modulus of the recording tape T. Further, in the present embodiment, the bending elastic modulus of the lower flange 56 is smaller than the bending elastic modulus of the upper flange 50. As an example, the bending elastic modulus of the lower flange 56 is 1000 MPa or more and 2400 MPa or less.

Figure 9:
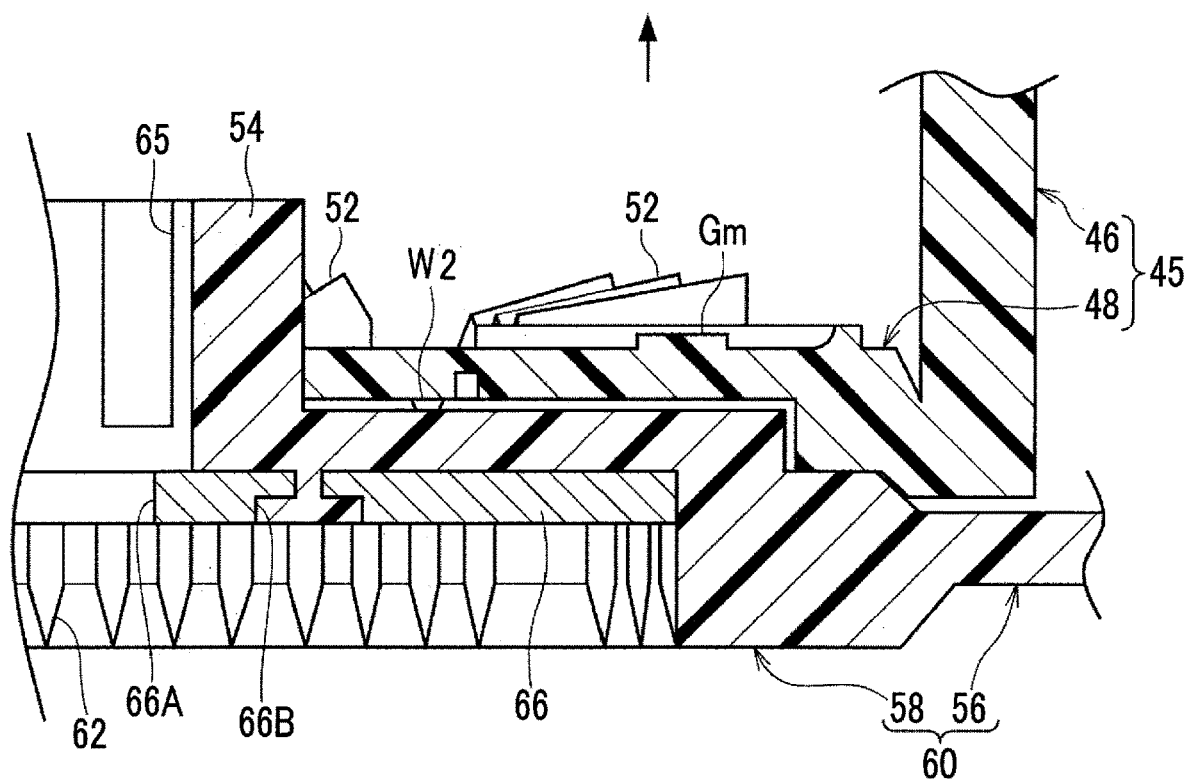
FIG. 9 is a partially enlarged cross-sectional view of the tape reel according to the first embodiment.
Figure 10:
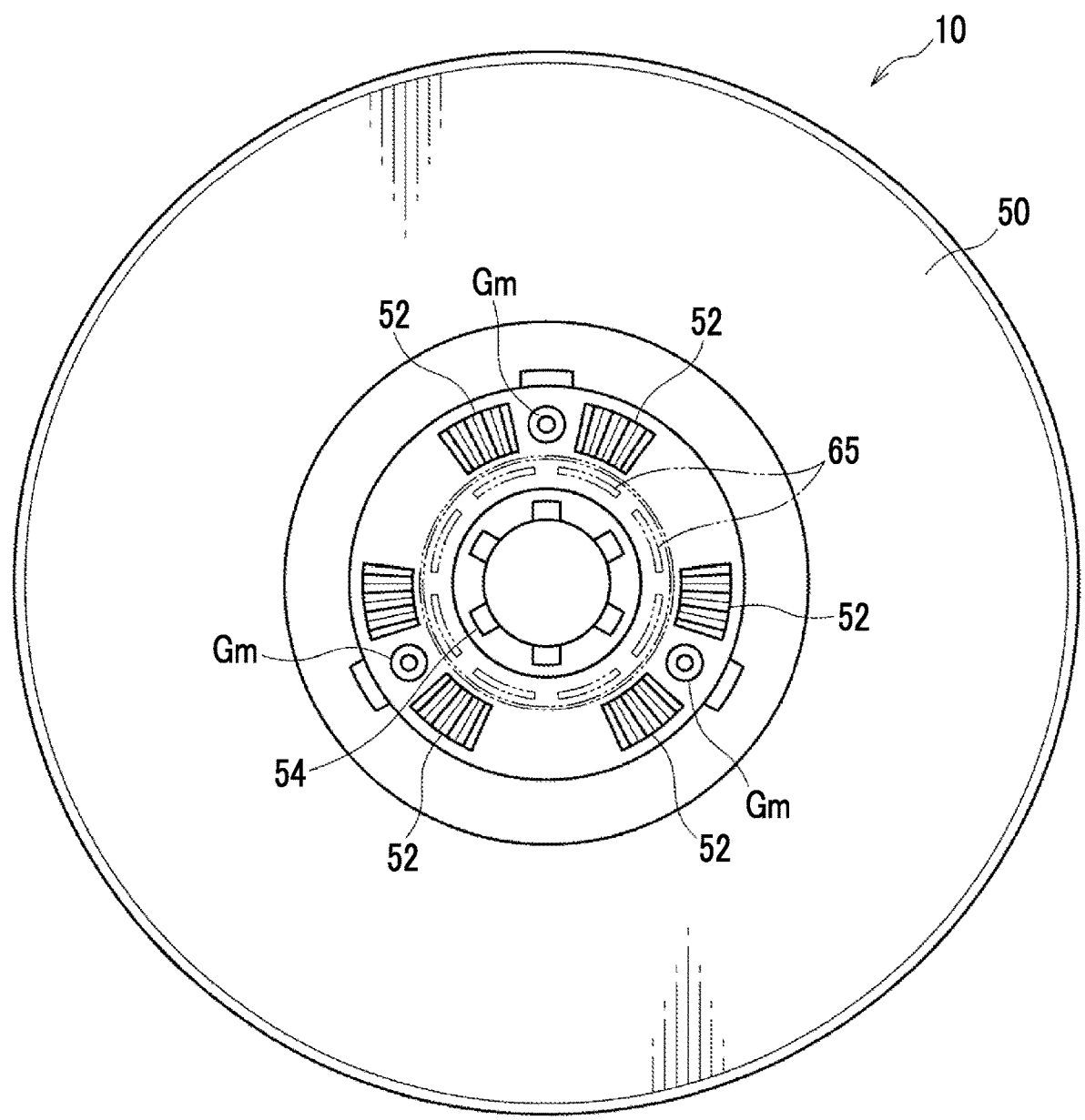
FIG. 10 is a plan view showing the tape reel according to the first embodiment.
Figure 11:
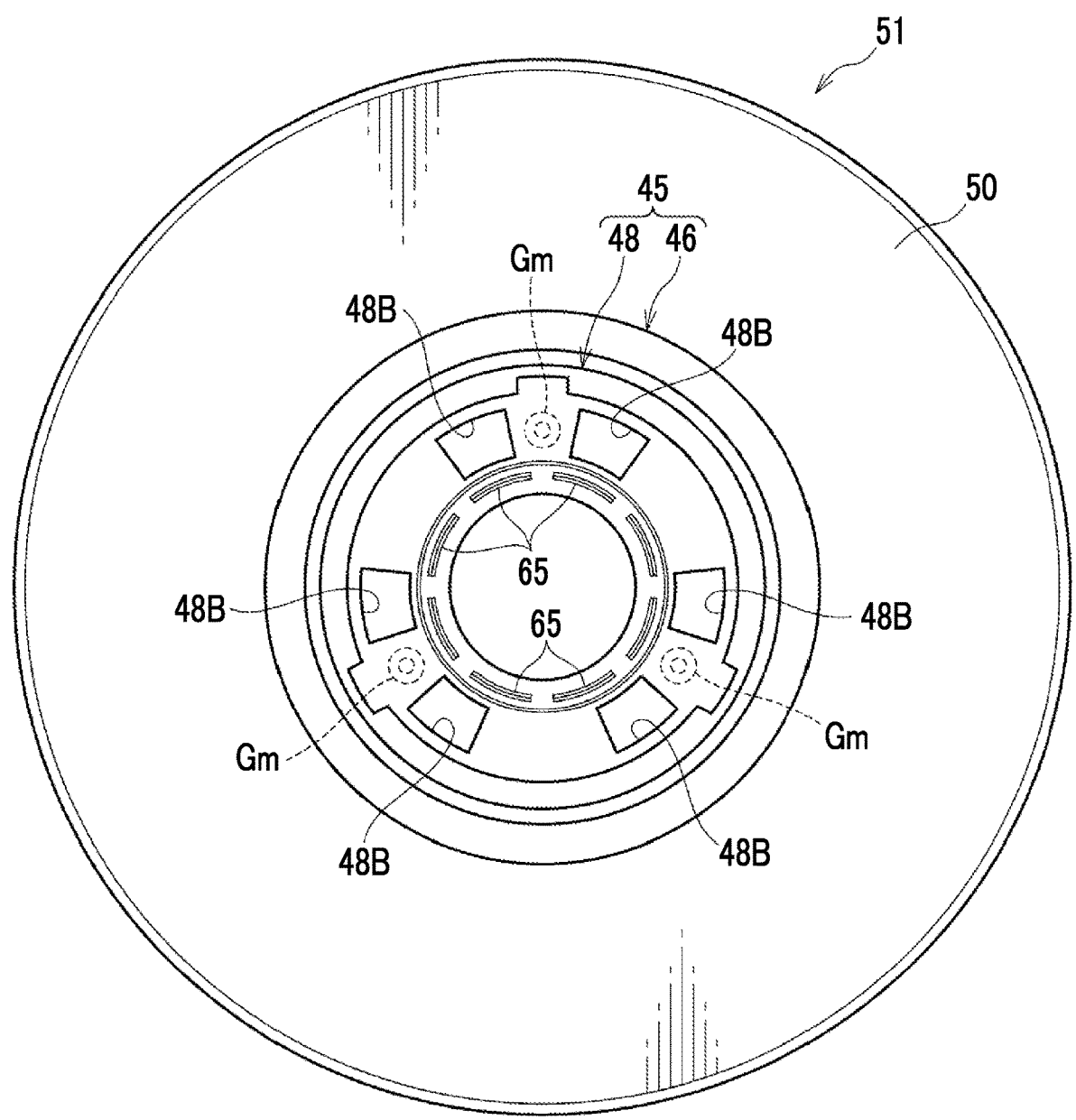
FIG. 11 is a bottom view showing an upper flange member of a tape reel according to the first embodiment.

As shown in FIGS. 5 and 9, the reel plate 66 is fixed to a lower surface side of the center portion 58 of the lower flange member 60. The reel plate 66 is a plate made of metal. The reel plate 66 is formed in a disc shape in which a through-hole 66A is provided in the axial center portion, and is coaxially disposed on the inner side in the radial direction of the reel gear 62. The reel plate 66 is attracted to the rotary shaft 100 in a contactless manner by the magnetic force of the magnet 106 provided in the rotary shaft 100 of the drive device.

The reel plate 66 is fixed to the center portion 58, that is, the lower flange member 60. Specifically, a plurality of (four in the present embodiment) small holes 66B are formed in the reel plate 66 so as to penetrate in a plate thickness direction. The small holes 66B are disposed at equal intervals in the circumferential direction along a virtual circle coaxial with the through-hole 66A. Each of the small holes 66B has a diameter-enlarged portion on the lower surface side of the reel plate 66, and has a so-called inro shape. The reel plate 66 is fixed to the lower flange member 60 by cooling and solidifying a resin material with which each small hole 66B is filled in a molding stage. The reel plate 66 may have a structure in which the reel plate 66 is fixed to the lower flange member 60 by caulking or the like.

The tape reel 10 is formed by welding the lower flange member 60 to the bottom plate 48 of the hub 45 at the center portion 58. Specifically, an energy director 65, which is a welding protrusion, is provided so as to protrude from the lower surface of the bottom plate 48 before welding. By applying ultrasonic vibration in a state in which the energy director 65 abuts on the upper surface of the center portion 58, the hub 45 and the lower flange member 60 are ultrasonically welded in a welded portion W2 (see FIG. 9).

Next, the action of the present embodiment will be described.

Figure 8:
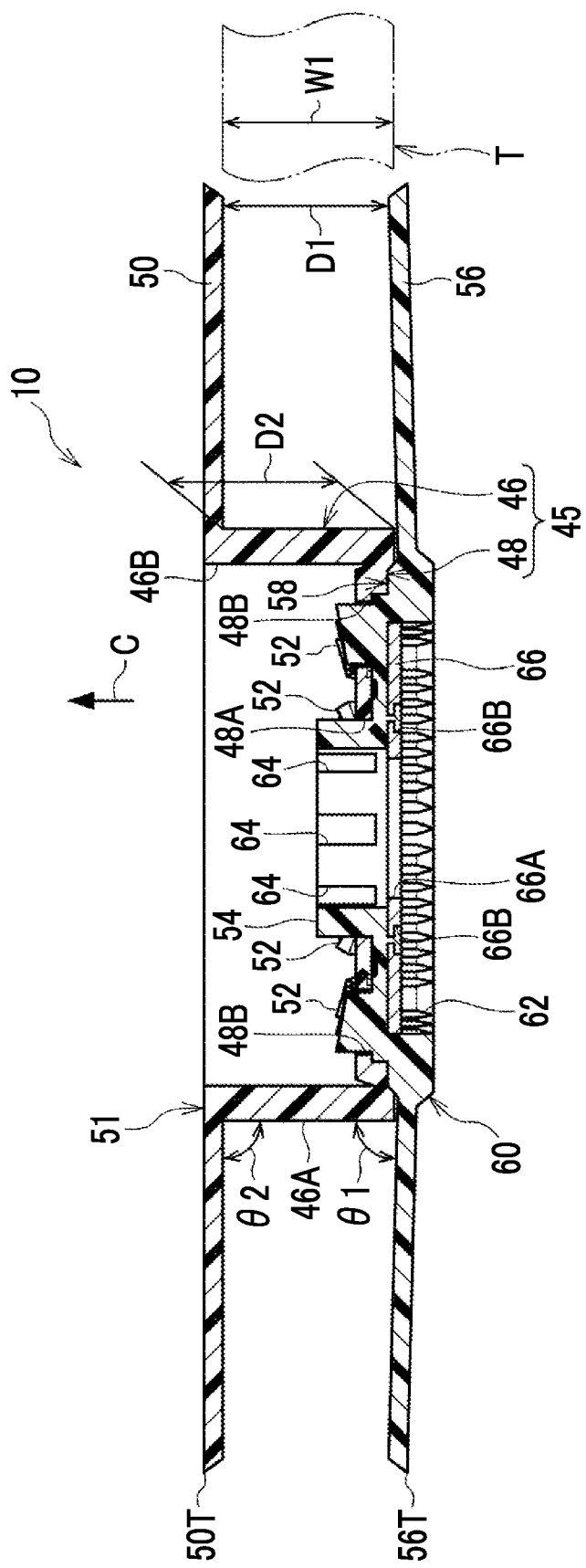
FIG. 8 is a cross-sectional view showing the tape reel according to the first embodiment.
Figure 12:
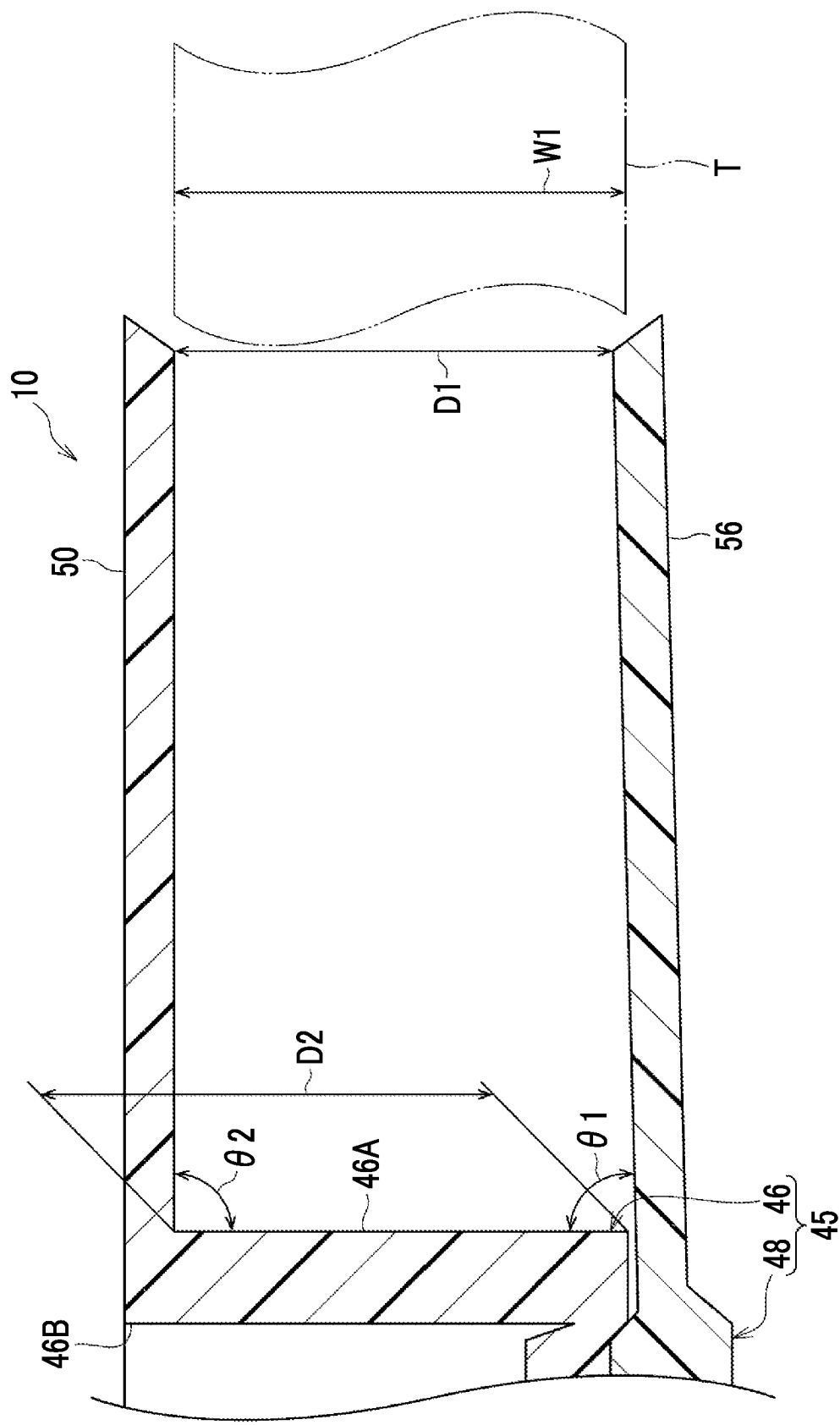
FIG. 12 is an enlarged cross-sectional view showing an upper flange and a lower flange of the tape reel according to the first embodiment.

In the present embodiment, as shown in FIGS. 8 and 12, in a state in which the recording tape T is not wound around the tape reel 10, the distance between the lower flange 56 and the upper flange 50 narrows while extending toward the outer side in the radial direction from the inner side in the radial direction. Therefore, for example, the recording tape T can be restrained by the lower flange 56 and the upper flange 50 from moving in the width direction of the recording tape T in a state in which the recording tape T is wound around the hub 45 as compared with a case in which the distance between the lower flange 56 and the upper flange 50 is constant and a case in which the distance widens while extending toward the outer side in the radial direction from the inner side in the radial direction.

Figure 14:
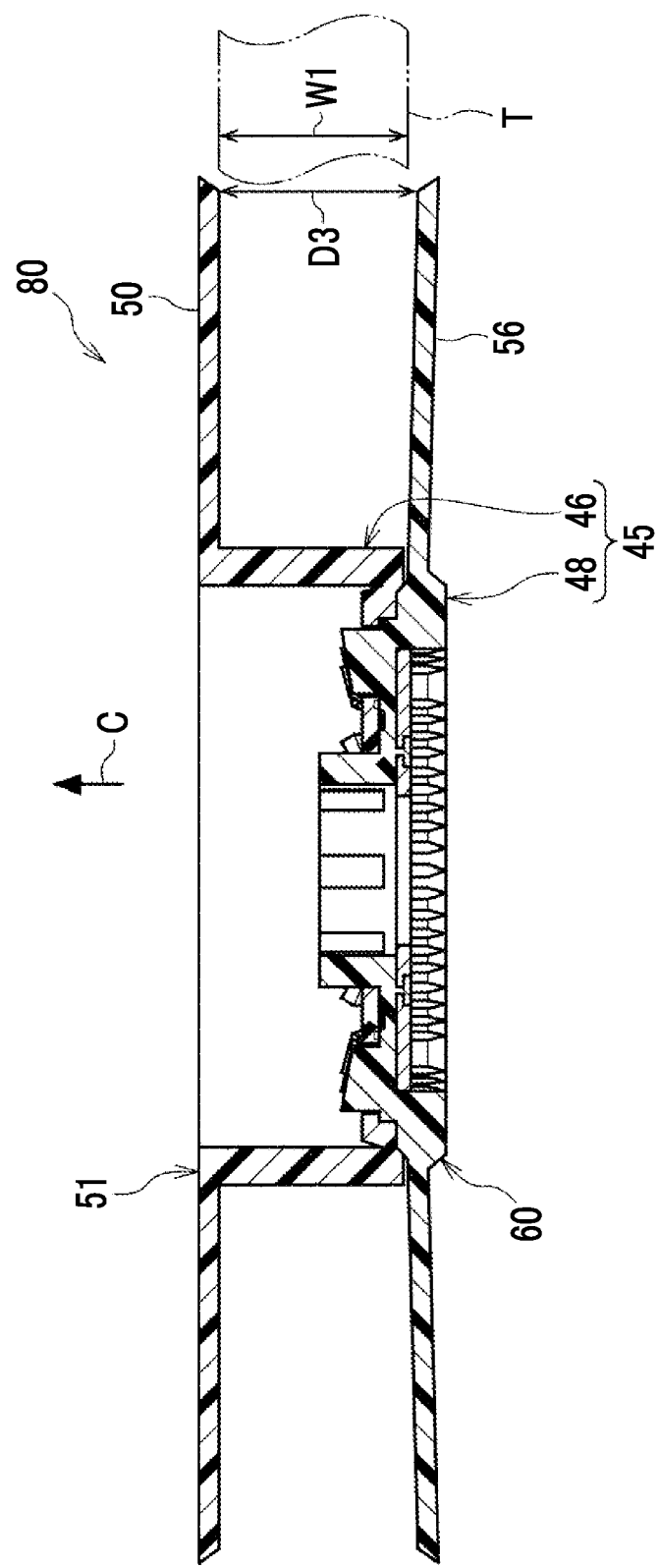
FIG. 14 is a cross-sectional view showing a tape reel according to a comparative example.

In particular, in the present embodiment, the distance D1 between the edge parts of the upper flange 50 and the lower flange 56 on the outer side in the radial direction is narrower than the width W1 of the recording tape T. Here, FIG. 14 shows a tape reel 80 of a comparative example. In FIG. 14, the same members as those of the tape reel 10 of the first embodiment are designated by the same reference numerals.

In the tape reel 80 of the comparative example, in a state in which the recording tape T is not wound around the tape reel 10, the distance between the lower flange 56 and the upper flange 50 widens while extending toward the outer side in the radial direction from the inner side in the radial direction. A distance D3 between the edge parts on the outer side in the radial direction is wider than the width W1 of the recording tape T.

In the tape reel 80 of the comparative example, one or both of the edges in the width direction of the recording tape T are separated from the upper flange 50 or the lower flange 56 in a state in which the recording tape T is wound around the hub 45.

Figure 13:
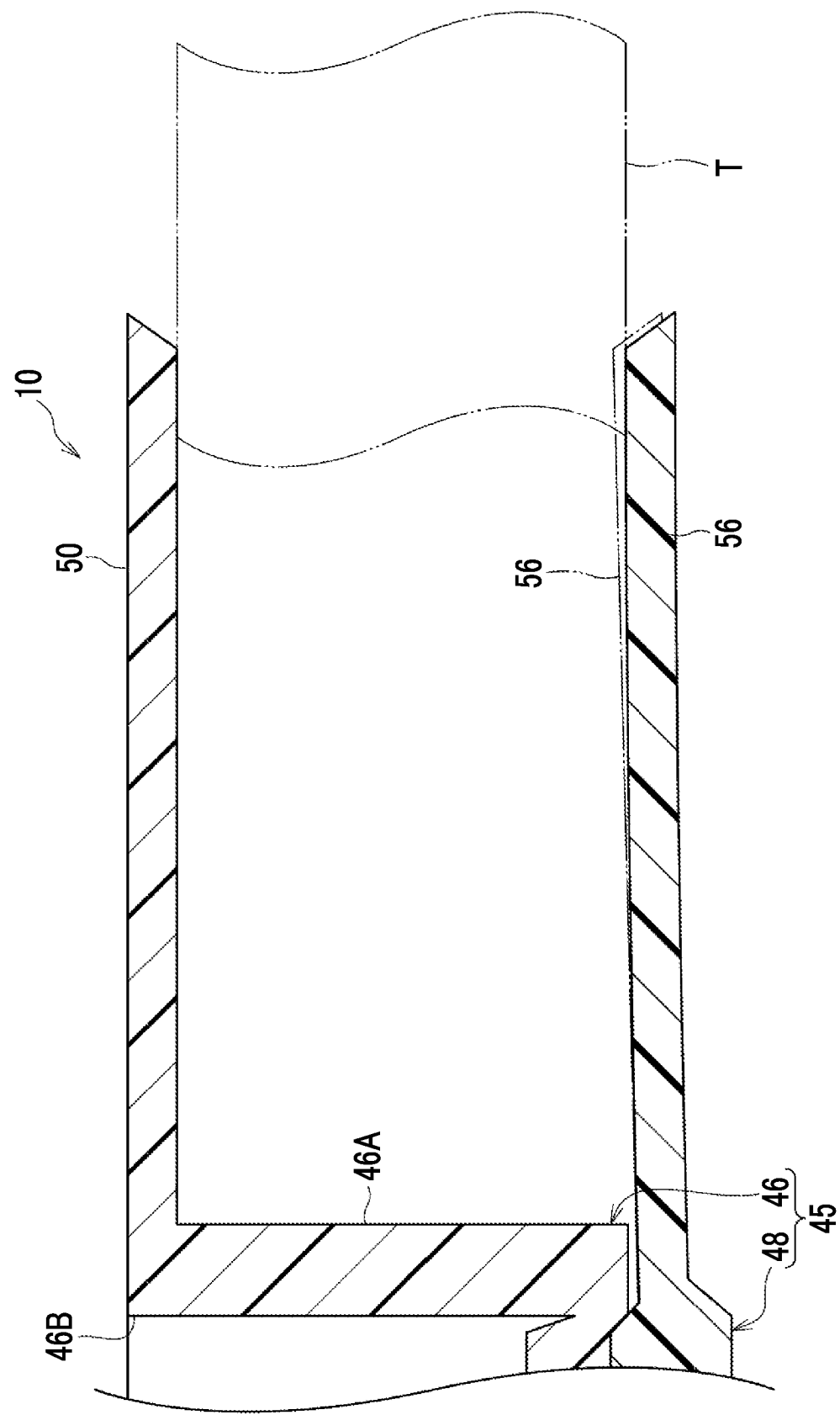
FIG. 13 is an enlarged cross-sectional view showing the upper flange and the lower flange of the tape reel according to the first embodiment in a state in which the lower flange is bent.

On the other hand, in the tape reel 10 of the present embodiment, since the distance D1 between the upper flange 50 and the lower flange 56 on the outer side in the radial direction is narrower than the width W1 of the recording tape T, as shown in FIG. 13, both edges in the width direction of the recording tape T come into contact with the upper flange 50 and the lower flange 56, respectively, in a state in which the recording tape T is wound around the hub 45. Therefore, in the present embodiment, the recording tape T can be restrained by the upper flange 50 and the lower flange 56 from moving in the width direction, as compared with a case in which both edges in the width direction of the recording tape T are separated from both the upper flange 50 and the lower flange 56 and a case in which both edges in the width direction of the recording tape T is separated from either one.

Further, in the present embodiment, the distance D2 between the edge parts of the upper flange 50 and the lower flange 56 on the inner side in the radial direction is wider than the width W1 of the recording tape T. Therefore, one or both of the upper flange 50 and the lower flange 56 are in a contactless state with respect to the recording tape T in the portions of the upper flange 50 and the lower flange 56 on the inner side in the radial direction, that is, in a portion in which the recording tape T is wound around the cylindrical wall 46, as compared with a case in which the distance D2 between the edge parts of the upper flange 50 and the lower flange 56 on the inner side in the radial direction is narrower than the width W1 of the recording tape T. One or both of the upper flange 50 and the lower flange 56 are in contactless with the recording tape T, so that it is possible to prevent the recording tape T from being deformed by receiving a force in the width direction because no force is applied from one or both of the upper flange 50 and the lower flange 56 in the width direction of the recording tape T.

In the present embodiment, the bending elastic modulus of the upper flange 50 and the bending elastic modulus of the lower flange 56 are each smaller than the bending elastic modulus of the recording tape T. Therefore, in a state in which the recording tape T is in contact with the upper flange 50 and the lower flange 56, the upper flange 50 and the lower flange 56 are more likely to bend than the recording tape T. That is, it is possible to prevent the recording tape T from being deformed by receiving a force in the width direction and the recording tape T from being damaged by receiving a force from the upper flange 50 and the lower flange 56 even in a case in which the recording tape T comes into contact with the upper flange 50 and the lower flange 56.

In particular, in the present embodiment, the bending elastic modulus of the lower flange 56 is smaller than the bending elastic modulus of the upper flange 50. Therefore, in a case in which the recording tape T is in contact with both the upper flange 50 and the lower flange 56, the lower flange 56 is more likely to bend than the upper flange 50. Accordingly, it is possible to prevent the recording tape T from being deformed by receiving a force in the width direction from the lower flange 56 and the recording tape T from being damaged by receiving a force from the lower flange 56 in a case in which the recording tape T comes into contact with the lower flange 56, as compared with a case in which the bending elastic modulus of the lower flange 56 is the same as the bending elastic modulus of the upper flange 50 and a case in which the bending elastic modulus of the lower flange 56 is larger than the bending elastic modulus of the upper flange 50.

Further, the bending elastic modulus of the upper flange 50 is larger than the bending elastic modulus of the lower flange 56. Therefore, the recording tape T can be restrained by the upper flange 50 from moving in the width direction in a state in which the recording tape T is in contact with the upper flange 50 and the lower flange 56, as compared with a case in which the bending elastic modulus of the upper flange 50 is the same as the bending elastic modulus of the lower flange 56 and a case in which the bending elastic modulus of the upper flange 50 is smaller than the bending elastic modulus of the lower flange 56.

In the present embodiment, the bending elastic modulus of the lower flange 56 is smaller than the bending elastic modulus of the recording tape T. Therefore, the recording tape T can be restrained from being damaged by the lower flange 56 because the lower flange 56 is more likely to be deformed than the recording tape T in a state in which the recording tape T is in contact with the lower flange 56, as compared with a case in which the bending elastic modulus of the lower flange 56 is larger than the bending elastic modulus of the recording tape T.

In the present embodiment, the bending elastic modulus of the upper flange 50 is smaller than the bending elastic modulus of the recording tape T. Therefore, the recording tape T can be restrained from being damaged by the upper flange 50 because the upper flange 50 is more likely to be deformed than the recording tape T in a state in which the recording tape T is in contact with the upper flange 50, as compared with a case in which the bending elastic modulus of the upper flange 50 is larger than the bending elastic modulus of the recording tape T.

In the present embodiment, the upper flange 50 is formed integrally with the cylindrical wall 46. Therefore, the number of components is smaller than in a case in which the upper flange 50 is a separate body from the cylindrical wall 46.

In the present embodiment, the lower flange 56 is a separate body from the cylindrical wall 46. Therefore, since there are fewer restrictions on the shape of the lower flange 56 than in a case in which the lower flange 56 is integrated with the cylindrical wall 46, the lower flange 56 can be easily formed.

In addition, the lower flange 56 is a separate body from the cylindrical wall 46, so that the degree of freedom in setting the bending elastic modulus of the lower flange 56 is high because there are fewer restrictions on the shape of the lower flange 56 than in a case in which the lower flange 56 is integrated with the cylindrical wall 46.

In the disclosed technology of the present application, a structure can be employed in which the lower flange 56 projects along the orthogonal direction to the axial direction of the cylindrical wall 46 when viewed in the radial direction of the cylindrical wall 46 and the upper flange 50 is inclined with respect to the orthogonal direction to the axial direction of the cylindrical wall 46 when viewed in the radial direction of the cylindrical wall 46. In the present embodiment, the upper flange 50 projects along the orthogonal direction to the axial direction of the cylindrical wall 46 when viewed in the radial direction of the cylindrical wall 46. The lower flange 56 is inclined in the orthogonal direction to the axial direction of the cylindrical wall 46 when viewed in the radial direction of the cylindrical wall 46. Therefore, for example, in a case in which the upper flange member 51 is formed by injection molding, the work of pulling out the upper flange member 51 from a mold is facilitated and the tape reel 10 is easily molded as compared with a case in which the upper flange 50 is inclined with respect to the orthogonal direction to the axial direction of the cylindrical wall 46.

In the present embodiment, an example is described in which the position of the edge part 56T of the lower flange 56 on the outer side in the radial direction is aligned with the position of the edge part 50T of the upper flange 50 on the outer side in the radial direction when viewed in the axial direction of the cylindrical wall 46. As described above, a structure in which the position of the edge part 50T and the position of the edge part 56T are not aligned and are different from each other in the radial direction, that is, a structure in which the diameter of the lower flange 56 and the diameter of the upper flange 50 are different from each other may be employed.

In a case in which the position of the edge part 56T and the position of the edge part 50T are different from each other in the radial direction, the position of the edge part of the small-diameter flange of which the edge part is relatively located on the inner side in the radial direction need only be used to set the distance D1 between the flanges on the outer side in the radial direction.

Figure 15:
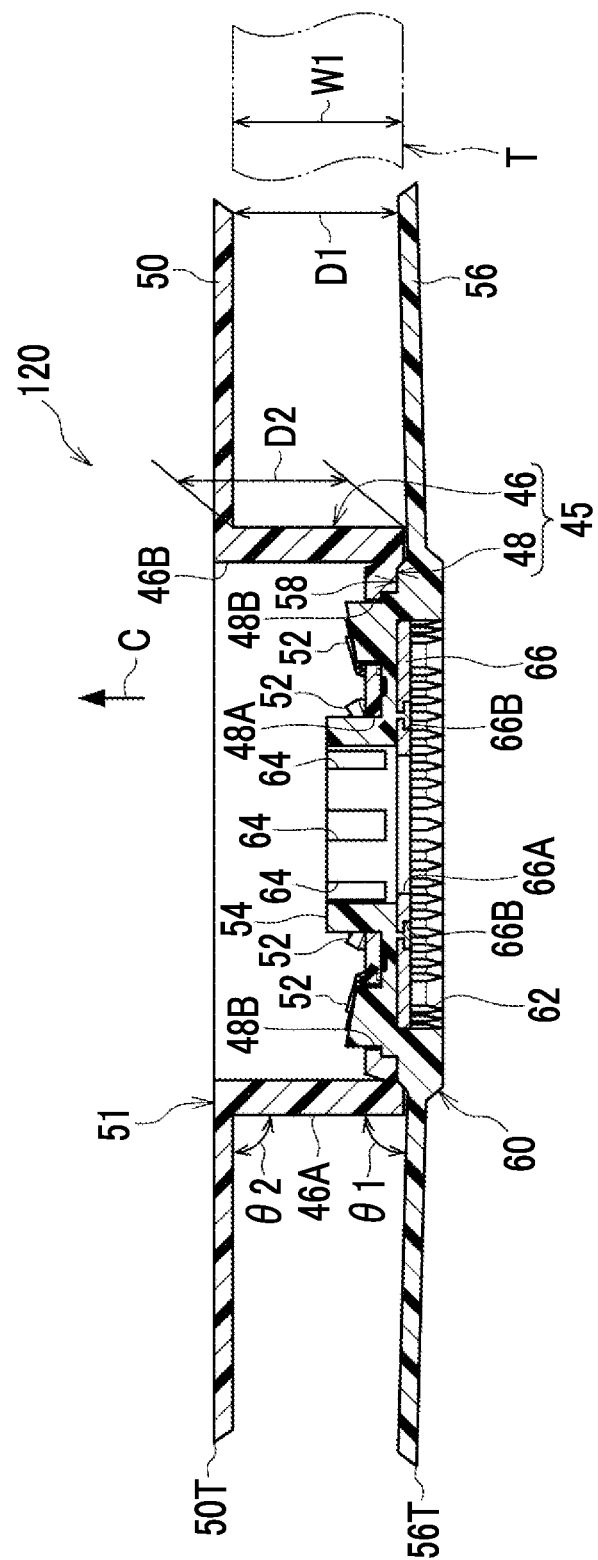
FIG. 15 is a cross-sectional view showing a tape reel according to a first modification example.

For example, in a tape reel 120 of a first modification example shown in FIG. 15, an example is described in which the upper flange 50 has a smaller diameter than the lower flange 56, and the edge part 50T of the upper flange 50 is located on the inner side in the radial direction with respect to the edge part 56T of the lower flange 56. In this case, the distance D1 between the upper flange 50 and the lower flange 56 at the position of the edge part 50T of the upper flange 50 need only be smaller than the width W1 of the recording tape T.

Figure 16:
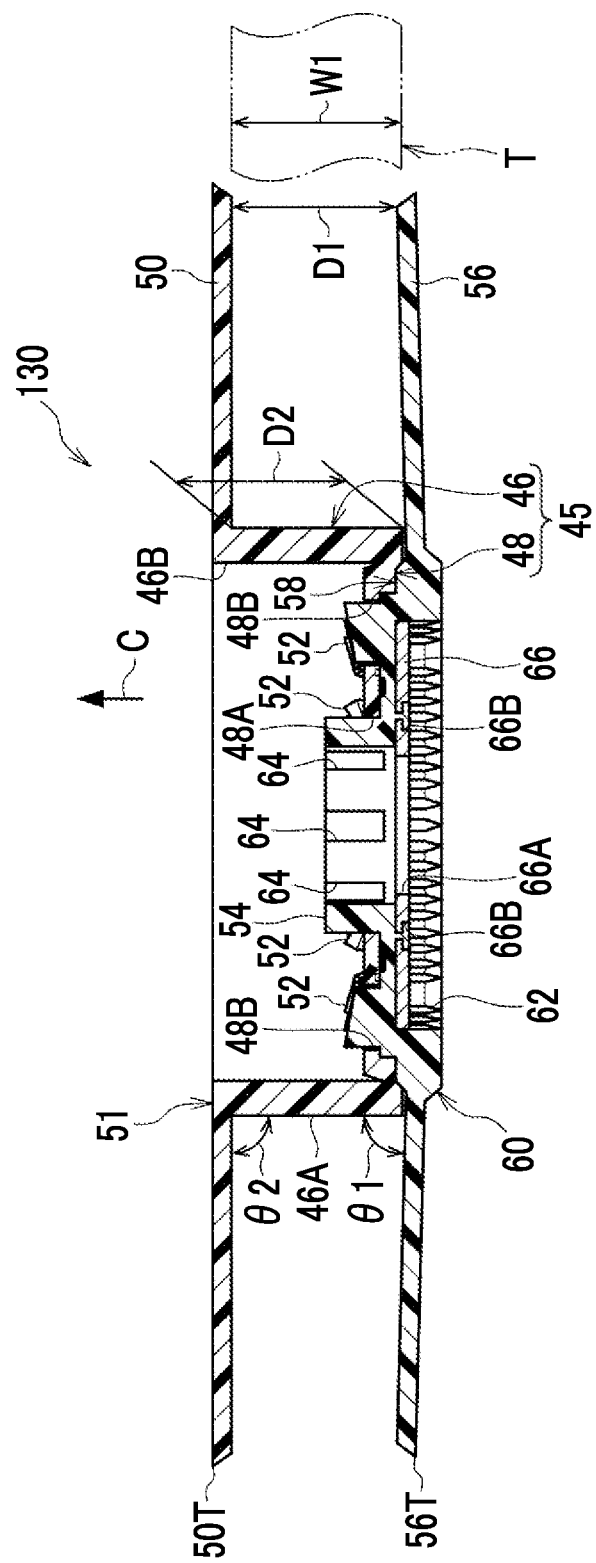
FIG. 16 is a cross-sectional view showing a tape reel according to a second modification example.

In a tape reel 130 of a second modification example shown in FIG. 16, an example is described in which the lower flange 56 has a smaller diameter than the upper flange 50 and the edge part 56T of the lower flange 56 is located on the inner side in the radial direction with respect to the edge part 50T of the upper flange 50. In this case, the distance D1 between the upper flange 50 and the lower flange 56 at the position of the edge part 56T of the lower flange 56 need only be smaller than the width W1 of the recording tape T.

In the description of the present specification, "parallel" indicates parallel in a meaning including an error generally allowed in the technical field to which the technology of the present disclosure belongs, in addition to completely parallel. In the description of the present specification, "vertical" indicates vertical in a meaning including an error generally allowed in the technical field to which the technology of the present disclosure belongs, in addition to completely vertical. In the description of the present specification, the "equal interval" indicates an equal interval in a meaning including an error generally allowed in the technical field to which the technology of the present disclosure belongs, in addition to the perfect equal interval. In the description of the present specification, "match" indicates a match in a meaning including an error generally allowed in the technical field to which the technology of the present disclosure belongs, in addition to the perfect match.

The contents described and shown above are detailed descriptions of the parts according to the technology of the present disclosure, and are merely an example of the technology of the present disclosure. For example, the above description according to configurations, functions, actions, and advantageous effects is description related to an example of the configurations, functions, actions, and advantageous effects of the parts according to the technology of the present disclosure. Therefore, it goes without saying that unnecessary parts may be deleted, new elements may be added, or replacements may be made for the contents described and shown above without departing from the gist of the technology of the present disclosure. Further, in order to avoid confusion and to facilitate understanding of the parts according to the technology of the present disclosure, description related to common technical knowledge and the like that do not require particular description to enable implementation of the technology of the present disclosure is omitted from the contents described and shown above.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case in which three or more matters are expressed by "and/or".

All documents, patent applications, and technical standards described in the present specification are incorporated in the present specification by reference to the same extent as in a case in which the individual documents, patent applications, and technical standards were specifically and individually stated to be incorporated by reference.

The present application further discloses the following appendixes.

Appendix 1

A tape reel comprising:
 a cylindrical portion around which a tape is wound;
 a first flange annularly projecting toward an outer side in a radial direction of the cylindrical portion from the cylindrical portion; and
 a second flange separated from the first flange in an axial direction of the cylindrical portion and annularly projecting toward the outer side in the radial direction from the cylindrical portion,
 in which a distance between the first flange and the second flange narrows while extending toward the outer side in the radial direction in a state before the tape is wound around the cylindrical portion, and
 a bending elastic modulus of the first flange is smaller than a bending elastic modulus of the second flange.

Appendix 2

The tape reel according to Appendix 1,
 in which the distance between an edge part of the first flange, which is provided on the outer side in the radial direction, and an edge part of the second flange, which is provided on the outer side in the radial direction, is narrower than a width of the tape.

Appendix 3

The tape reel according to Appendix 1 or 2,
 in which the bending elastic modulus of the first flange is smaller than a bending elastic modulus of the tape.

Appendix 4

The tape reel according to any one of Appendixes 1 to 3,
 in which the bending elastic modulus of the second flange is smaller than a bending elastic modulus of the tape.

Appendix 5

The tape reel according to any one of Appendixes 1 to 4,
 in which the second flange is formed integrally with the cylindrical portion.

Appendix 6

The tape reel according to any one of Appendixes 1 to 5,
 in which the first flange is a separate body from the cylindrical portion.

Appendix 7

The tape reel according to Appendix 6,
 in which the first flange is inclined with respect to an orthogonal direction to the axial direction when viewed in the radial direction, and
 the second flange projects along the orthogonal direction when viewed in the radial direction.

Appendix 8

A tape cartridge comprising:
 the tape reel according to any one of Appendixes 1 to 7; and
 a case that rotatably supports the tape reel and accommodates the tape reel and a tape wound around the tape reel.

What is claimed is:

1. A tape reel comprising:
a cylindrical portion around which a tape is wound;
a first flange annularly projecting toward an outer side in a radial direction of the cylindrical portion from the cylindrical portion; and
a second flange separated from the first flange in an axial direction of the cylindrical portion and annularly projecting toward the outer side in the radial direction from the cylindrical portion,
wherein a distance between the first flange and the second flange becomes narrower while extending toward the outer side in the radial direction in a state before the tape is wound around the cylindrical portion, and
a bending elastic modulus of the first flange is smaller than a bending elastic modulus of the second flange.

2. The tape reel according to claim 1,
wherein the distance between an edge part at the outer side in the radial direction of the first flange and an edge part at the outer side in the radial direction of the second flange is narrower than a width of the tape.

3. The tape reel according to claim 1,
wherein the bending elastic modulus of the first flange is smaller than a bending elastic modulus of the tape.

4. The tape reel according to claim 1,
wherein the bending elastic modulus of the second flange is smaller than a bending elastic modulus of the tape.

5. The tape reel according to claim 1,
wherein the second flange is formed integrally with the cylindrical portion.

6. The tape reel according to claim 1,
wherein the first flange is a separate body from the cylindrical portion.

7. The tape reel according to claim 6,
wherein the first flange is inclined with respect to an orthogonal direction to the axial direction when viewed in the radial direction, and
the second flange projects along the orthogonal direction when viewed in the radial direction.

8. A tape cartridge comprising:
the tape reel according to claim 1; and
a case that rotatably supports the tape reel and accommodates the tape reel and the tape wound on the tape reel.

\* \* \* \* \*